(12) United States Patent
Mulatier et al.

(10) Patent No.: US 6,327,014 B1
(45) Date of Patent: Dec. 4, 2001

(54) LIQUID CRYSTAL SCREEN WITH ENLARGED VIEWING ANGLE

(75) Inventors: Laurence Mulatier, Varces (FR); Gunther Haas, Leonberg (DE); Bruno Mourey, Coublevie (FR)

(73) Assignee: Thomson Licensing S.A., Boulogne-Cedex (FR)

( * ) Notice: Subject to any disclaimer, the term of this patent is extended or adjusted under 35 U.S.C. 154(b) by 565 days.

(21) Appl. No.: 08/608,042

(22) Filed: Feb. 28, 1996

(30) Foreign Application Priority Data

Mar. 9, 1995 (FR) .................................. 95 02776

(51) Int. Cl.[7] ........................... G02F 1/1337; G02F 1/141
(52) U.S. Cl. ............................. 349/143; 349/129; 349/37
(58) Field of Search ................... 359/87, 93, 67; 349/139, 129, 110, 37, 143

(56) References Cited

U.S. PATENT DOCUMENTS

| | | | | |
|---|---|---|---|---|
| 4,759,610 | * | 7/1988 | Yanagisawa | 359/67 |
| 5,054,910 | * | 10/1991 | Kozaki et al. | 359/54 |
| 5,061,045 | * | 10/1991 | Yoneya et al. | 359/93 |
| 5,084,778 | * | 1/1992 | DeJule et al. | 359/87 |
| 5,136,407 | * | 8/1992 | Clerc | 359/87 |
| 5,229,873 | * | 7/1993 | Hirose et al. | 359/87 |
| 5,309,264 | | 5/1994 | Lien et al. | 359/87 |
| 5,499,123 | * | 3/1996 | Mikoshiba | 359/67 |
| 5,510,916 | * | 4/1996 | Takahashi | 359/67 |

FOREIGN PATENT DOCUMENTS

| | | |
|---|---|---|
| 445777 | 9/1991 | (EP) . |
| 0636917 | 2/1995 | (EP) . |

OTHER PUBLICATIONS

SID International Symposium–Digest of Technical Papers, Seattle May 16–21, 1993, vol. 24, Part 1, May 16, 1993 Society for Information Display, pp. 269–272, Lien et al. 'Two–Domain TN–LCDs Fabricated by Parallel Fringe Field Method'.

SID International Symposim–Digest of Technical Papers, San Jose Jun. 14–16, 1994, vol. 25, Jun. 14, 1994, Society for Information Display pp. 594–596, Lien et al.

SID International Symposium Digest of Papers, Boston May 17–22, 1992 vol. 23, May 17, 1992 Society for Information Display pp. 498–801 Koike Y et al.

* cited by examiner

*Primary Examiner*—Toan Ton
(74) *Attorney, Agent, or Firm*—J. S. Tripoli; F. A. Wein

(57) ABSTRACT

The invention relates to a special structure of an electro-optic cell or pixel in a liquid crystal screen that improves the transmittance compared with prior-art screens. The pixel is formed by two substrate layers, on one of which there is a pixel electrode and on the other a counter-electrode, with a layer of liquid crystal molecules between these electrodes, in which the counter-electrode is divided into two parts by a groove, wherein a non-zero polarization voltage is applied between the electrode and the counter-electrode when the pixel is not addressed.

9 Claims, 4 Drawing Sheets

LIQUID CRYSTAL SCREEN WITH ENLARGED VIEWING ANGLE

BACKGROUND OF THE INVENTION

The invention relates to a special structure of electro-optic cell (pixel) in a liquid crystal screen providing an enlarged viewing angle compared with known liquid crystal screens.

DESCRIPTION OF THE PRIOR ART

Liquid crystal screens for projection or direct viewing are generally composed of lines (selection lines) and columns (data lines). At each intersection there is a pixel electrode connected to these lines via transistors. The gates of these transistors form the selection lines and are controlled by peripheral control circuits that scan the lines and make the transistors of each line conducting by using the data lines, connected to other peripheral control circuits, to polarizing the electrodes and modify the optical properties of the liquid crystal located between these electrodes and the counter-electrode (or reference electrode), thereby enabling images to be formed on the screen.

One of the major disadvantages of this type of screen is that the optical properties depend on the angular visibility, i.e. the direction of propagation of the light through the pixels, in particular for images having several levels of gray. FIG. 1 shows a cell of twisted nematic liquid crystals 1 with two viewing planes, the horizontal plane 2 and the vertical plane 3. In the case of crossed polarizers, a voltage across the electrode terminals creates an electric field through the liquid crystal that aligns the molecules; the pixel is in its non-conducting state and appears black. The angular distribution of the optical transmittance of the light is symmetric about the horizontal plane 2 and asymmetric in the vertical plane 3. The result is a dark area S and a light area C on opposite sides of the horizontal plane. The direction of maximum contrast D, corresponding to the minimum transmittance, is located in the vertical plane 3; its orientation depends on the voltage applied across the electrodes of the pixel, in other words the luminosity. Consequently, the quality of the image displayed on the screen varies with the viewing angle; at very large angles the contrast may even be inverted.

The direction of the various viewing zones depends on the orientation of the liquid crystal molecules. FIG. 2 shows the alignment of these molecules 4 in the case of a twisted nematic liquid crystal in the presence of a voltage U across the electrodes 5 and 6. On the face towards the liquid crystal these electrodes are covered with an alignment layer 7 (which can be a polyimide) imposing a special direction on the liquid crystal molecules 4. The directions of the dark and light zones, 8 and 9, mentioned above are given by the inclination taken by the molecules of liquid crystal in the presence of the electric field. By treating the polyimide coating in a certain manner, we can make the liquid crystal molecules take a pre-inclined position, which is an angle between the molecules closest to the substrate and the substrate itself, in the absence of the electric field.

In order to overcome these problems and obtain a larger angular field of vision, K. H. Yang, in an article in the "11th International Display Research Conference", 1991, page 68, proposes a solution that is illustrated in FIG. 3. This consists in dividing each pixel into two domains each having an opposing inclination when a voltage U is applied to the electrodes. The alignment layers of each of these half-pixels are engraved so as to create opposing tilts. This can be done in two stages, separated by a masking stage, of anti-parallel rubbing of the polyimide alignment layers, or by depositing silicon oxide SiO under vacuum. In this case, the effects are neutralized and we obtain symmetrical vision regardless of the angle of the viewing angle.

The drawback of this solution is that it is technically difficult to implement, since it requires the engraving of two different alignment layers of the liquid crystal molecules, which is very difficult to achieve under mass production conditions.

SUMMARY OF THE INVENTION

The present invention resolves these problems through the use of a screen structure that is easy to fabricate.

The invention relates to an electro-optic cell or pixel formed by two substrate layers, on one of which there is a pixel electrode and on the other a counter-electrode, with a layer of liquid crystal molecules between these electrodes, in which the counter-electrode is divided into two parts by a groove, wherein a non-zero polarization voltage is applied between the electrode and the counter-electrode when the pixel is not addressed.

Said groove in the counter-electrode, dividing it into two parts (or domains), preferably cuts this electrode through the middle.

Said polarization voltage is preferably between 0.8 and 1.3 times the value of the threshold polarization voltage of the liquid crystal in the presence of a homogeneous electric field.

Another characteristic of the invention is that the said pixel has homogeneous alignment layers. The division of each pixel into two domains, in each of which the molecules have different inclinations, is produced only by the effect of the electric field between said pixel electrode and said counter-electrode.

In order to avoid any preference for one of the two domains introduced by the alignment layer, the alignment layer may cause the liquid crystal molecules to have either an alignment strictly parallel to the substrate or, in the case of the presence of an intrinsic pre-inclination of the alignment layer, an anti-parallel alignment.

Another improvement of the invention consists in slightly increasing the thickness of the liquid crystal so as to maintain the optical characteristic in the presence of said polarization voltage when the pixel is not addressed. This thickness should preferably be such that its product with the bifringence, divided by the wavelength of the light is slightly greater than the constant $\sqrt{3/2}$, which is typically between 1.1 and 1.5 times this constant.

Another characteristic of the invention is that an opaque material can be deposited on one of the substrate layers in order to mask the groove of the counter-electrode; moreover, this opaque material can be used as a storage capacity.

Finally, the invention also relates to a liquid crystal screen that makes use of such electro-optic cells.

BRIEF DESCRIPTION OF THE DRAWINGS

The invention will be better understood and other advantages will become clear on reading the following description of an embodiment, taken as a non-imitative example, making reference to the appended figures, of which.

DETAILED DESCRIPTION OF ONE EMBODIMENT

Figure 1:
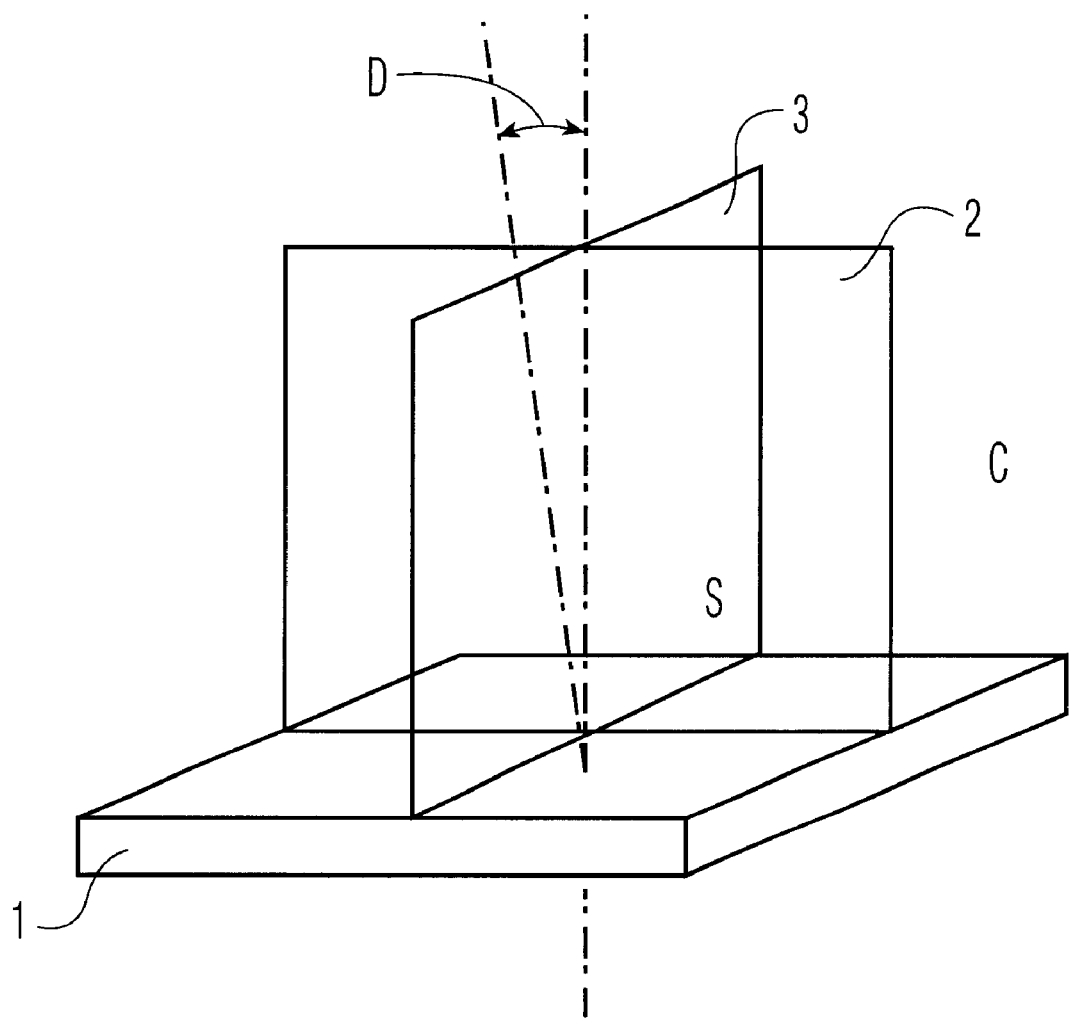
FIG. 1, already described, shows an example of a pixel of a twisted nematic liquid crystal according to the prior art, showing the presence of dark and light zones.
Figure 2:
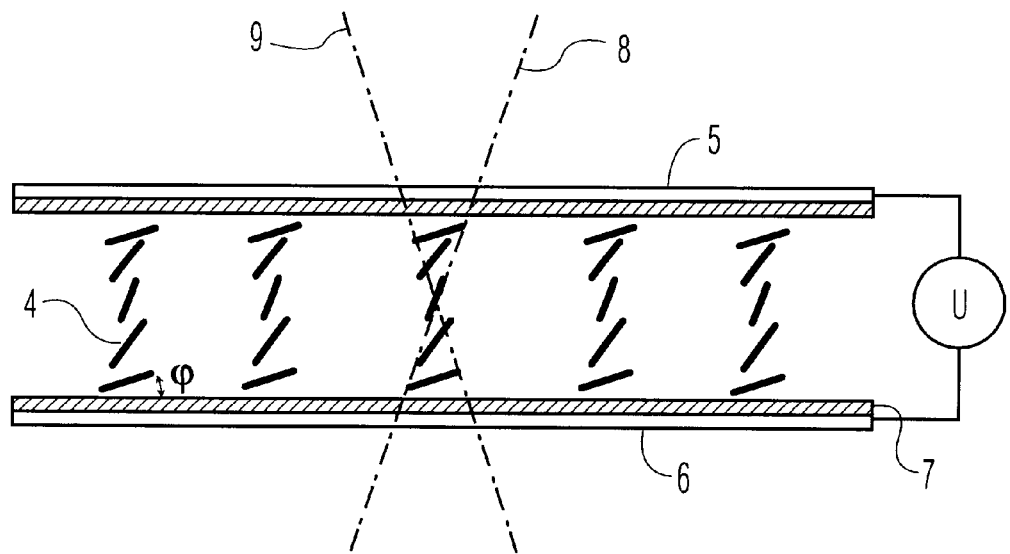
FIG. 2, already described, shows a sectional view of the pixel of FIG. 1 to illustrate the orientations of the liquid crystal molecules in these zones.
Figure 3:
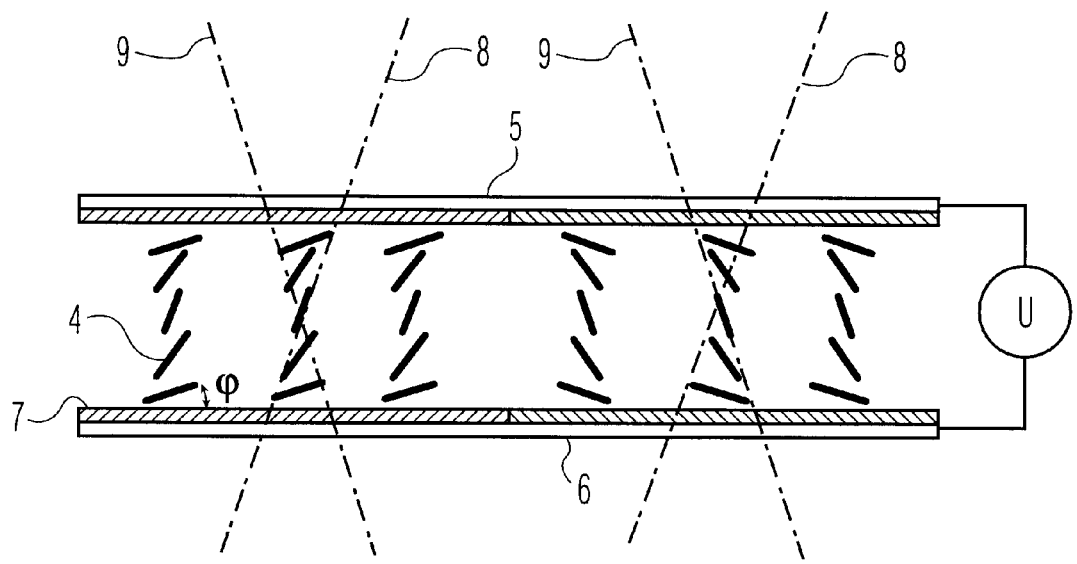
FIG. 3, already described, shows a prior-art solution designed to eliminate the undesirable effects of these zones.
Figure 4A:
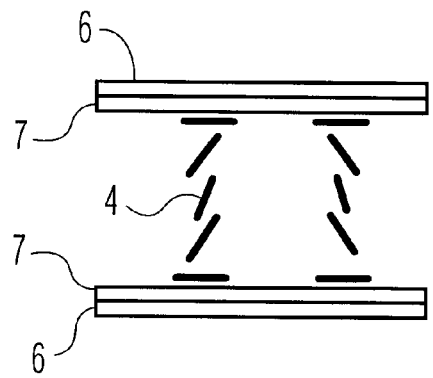
FIGS. 4a and 4b show twisted nematic liquid crystal molecules that are used in the present invention and that have, in the absence of an electric field, parallel and anti-parallel alignments respectively.

One of the characteristics of the invention is the utilization of an alignment of liquid crystal molecules without effective pre-inclination in the absence of an electric field. As shown in FIG. 4a, the alignment layers 7 can be fabricated so as to obtain liquid crystal molecules 4 whose alignment is said to be "parallel", in other words having a pre-inclination of 0°. This can be achieved by gently brushing or pressing of the polyimide, or by oblique deposition of silicon oxide SiO. Alternatively, it is possible to choose an alignment said to be "anti-parallel" by using an alignment layer that creates a pre-inclination different from 0°. In this case, the layers above and below the pixel are arranged such that the effects of the two different pre-inclinations are opposite to each other and cancel each other.

Figure 5:
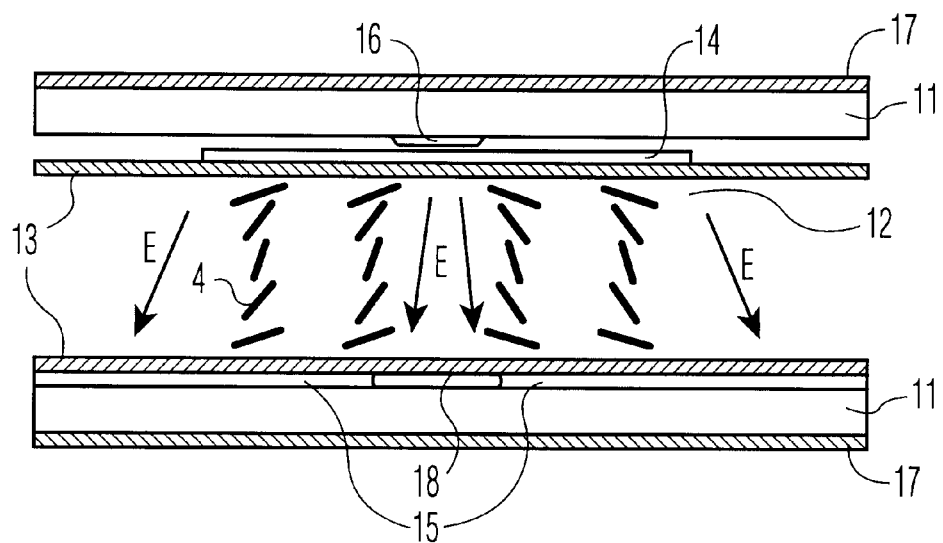
FIG. 5, is a preferred embodiment of a pixel to which the present invention is applied.

FIG. 5 shows a section of a liquid crystal screen usable in the invention. It comprises two transparent substrate layers 11 on whose inner surfaces are mounted transparent electrodes 14 and a transparent counter-electrode 15. On the inner faces of these electrodes 14 and 15 the alignment layers 13 are deposited and treated. These alignment layers can be either of the type providing parallel alignment or of the type imposing a pre-inclination of the liquid crystal molecules 4 located between the two layers. In the latter case, the alignment layers above and below the pixel are arranged in an anti-parallel fashion. The said liquid crystal can be twisted nematic or any other type whose electo-optic effects are modified by an electric field E. Furthermore, these pixels are bracketed by two polarizers 7.

The counter-electrode 15 has a groove 18 that cuts the pixel through the middle. This groove preferably has a width of 0.5 to 2 times the thickness of the layer of molecules of the liquid crystal 4, which is typically about 3 to 10 microns. When a potential difference U is applied to the pixel electrodes 14 and counter-electrode 15, this groove creates a lateral component in the electric field E. The electric field E is then perpendicular to the electrodes in the areas where these are facing each other, and inclined in the areas of the edges of the pixel electrodes 14 and in the areas between the groove 18 and the electrode 14, as shown in FIG. 5. In this way, two optical domains each having different tilt angles are created by the non-uniform distribution of the electric field E resulting from the structure of the pixel according to the invention.

In order to eliminate any optical perturbations due to the boundary between the two domains, it is necessary to mask the part around the groove 18 by depositing an opaque material 16, for example on the external face of the electrode 14. This material can be metal and can be used as a storage capacity, for example in the case of active matrix addressing.

In the case of a screen addressed by an active matrix, the counter-electrode generally covers the whole screen. In this case, it is necessary to engrave this counter-electrode in order to make the grooves 18; this is a very simple supplementary operation. The mask used for this operation can be the same as that used to deposit the opaque mask 16.

It is obvious that this particular type of addressing is non-limitative.

Figure 6:
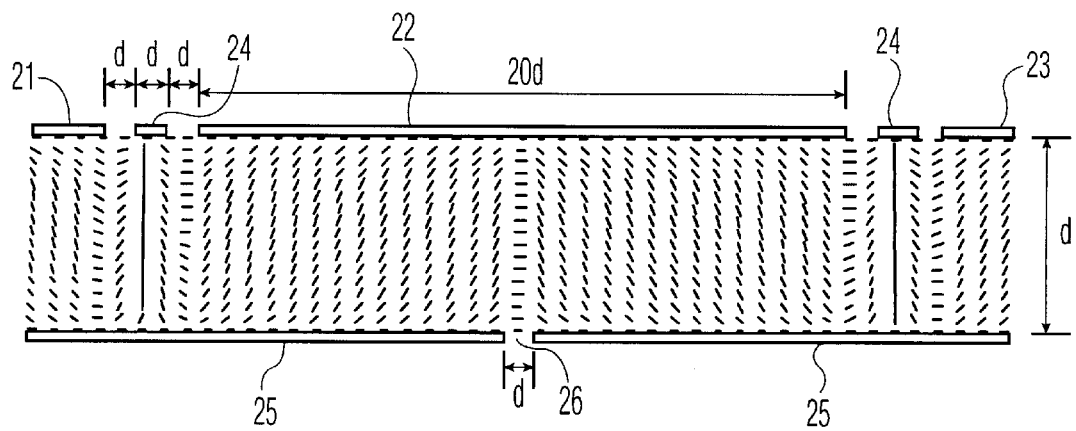
FIGS. 6 and 7 show the orientations obtained using a pixel structure according to two embodiments of the invention.

FIG. 6 shows a sectional view of a liquid crystal screen according to a first embodiment of the invention. It is composed of electrodes 21, 22 and 23 separated by selection lines (or data lines) 24, and a counter-electrode 25 with grooves 26. The liquid crystal molecules 4 have a "parallel" aligment, as describe with reference to FIG. 4a.

Figure 4B:
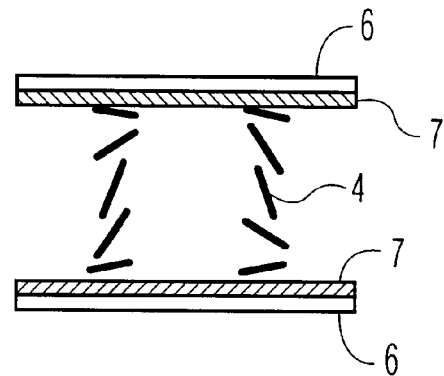
Figure 7:
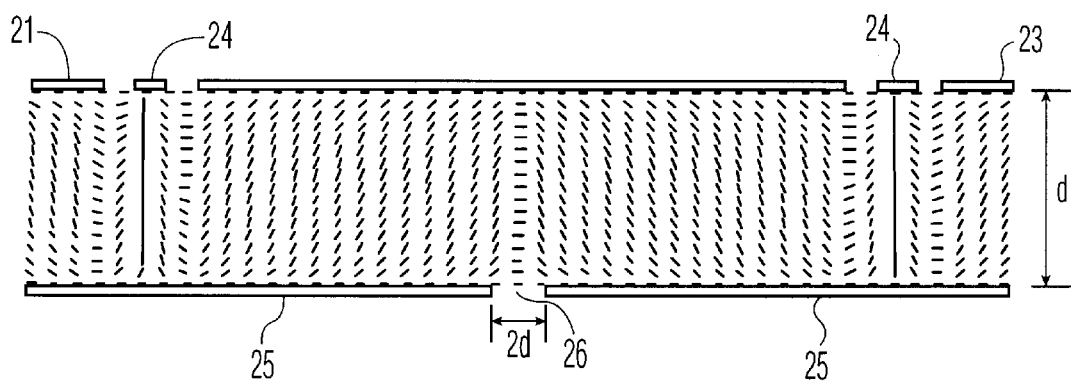

FIG. 7 shows the structure of a screen identical to the one in FIG. 6 but have a pre-inclination of 1°. the molecules having an "anti-parallel" alignment, as described with reference to FIG. 4b.

Owing to the relatively long delay for formation of the two domains, according to the invention, the polarization potential is not equal to zero when the pixel is not addressed (OFF state), in order to maintain the structure of the domains. The value of the polarization potential U is preferably between 0.8 and 1.3 times the value of the threshold voltage of the liquid crystal in the present of a uniform field.

Furthermore, in order to preserve the optical properties of the screen, it is preferable to modify slightly the thickness of the volume of the liquid crystal, the reason being that this thickness d is generally chosen so that the effective bifringence gives maximum transmission in the OFF state and also good angular characteristics. This means that the product $d.\Delta n/\lambda$, where $\Delta n$ is the bifringence and $\lambda$ is the wavelength of the light, takes a certain value preferably equal to $\sqrt{3}/2$. In the case of a pre-polarization in the OFF state, the liquid crystal molecules being slightly inclined, the effective value of $d.\Delta n$ is slightly reduced. For this reason, it is preferable to increase the thickness of the liquid crystal to compensate this effect. This modification is preferable every time that the product $d.\Delta n$ is involved.

The present invention is applicable to all types of liquid crystal screens, for projection or direct viewing, whether equipped with integrated control circuits or not.

What is claimed is:

1. Electro-optic cell or pixel formed by two substrate layers, on one of which there is a pixel electrode and on the other a counter-electrode, with a layer of liquid crystal molecules between these electrodes, in which the counter-electrode is divided into two parts by a groove, wherein a non-zero polarization voltage is applied between the electrode and the counter-electrode when the pixel is not addressed.

2. Electro-optic cell according to claim 1, wherein said layer of liquid crystal molecules has a thickness such that the product of the bifringence and this thickness, divided by the wavelength of light, is slightly greater than the constant $\sqrt{3}/2$.

3. Electro-optic cell according to claim 2, wherein said thickness of said layer of liquid crystal molecules is such that the product of the bifringence and this thickness, divided by the wavelength of the light, is between 1.1 and 1.5 times the constant $\sqrt{3}/2$.

4. Electro-optic cell according to claim 1, wherein the inclination of the molecules in one of said two parts of the counter-electrode is opposite to that of the molecules in the other part, under the influence of an electric field between the said pixel electrode and said counter-electrode.

5. Electro-optic cell according to claim 4, wherein said liquid crystal molecules have a parallel alignment in the absence of an electric field.

6. Electro-optic cell according to claim 4, wherein said liquid crystal molecules have an anti-parallel alignment in the absence of an electric field.

7. Electro-optic cell according to claim 1, wherein an opaque material is deposited on one of the substrates in order to mask said groove.

8. Electro-optic cell according to claim 7, wherein said opaque material is a metal used a storage capacity.

9. Liquid crystal screen that includes electro-optic cells according to claim 1.

* * * * *